United States Patent
Shull et al.

(10) Patent No.: US 12,528,064 B2
(45) Date of Patent: Jan. 20, 2026

(54) SELF-STABILIZED THERMOTHICKENING COLLOIDS

(71) Applicant: Northwestern University, Evanston, IL (US)

(72) Inventors: Kenneth R. Shull, Evanston, IL (US); Yaoyao Chen, Evanston, IL (US)

(73) Assignee: Northwestern University, Evanston, IL (US)

( * ) Notice: Subject to any disclaimer, the term of this patent is extended or adjusted under 35 U.S.C. 154(b) by 1172 days.

(21) Appl. No.: 17/420,952

(22) PCT Filed: Feb. 14, 2020

(86) PCT No.: PCT/US2020/018245
§ 371 (c)(1),
(2) Date: Jul. 6, 2021

(87) PCT Pub. No.: WO2020/172054
PCT Pub. Date: Aug. 27, 2020

(65) Prior Publication Data
US 2022/0088555 A1    Mar. 24, 2022

Related U.S. Application Data

(60) Provisional application No. 62/807,331, filed on Feb. 19, 2019.

(51) Int. Cl.
*C08L 33/02* (2006.01)
*A61K 9/107* (2006.01)
(Continued)

(52) U.S. Cl.
CPC ........... *B01J 13/0082* (2013.01); *C08L 33/02* (2013.01); *C08L 39/08* (2013.01); *C08L 2201/50* (2013.01)

(58) Field of Classification Search
CPC ....... B01J 13/0082; C08L 33/02; C08L 39/08; C08L 2201/50; A61K 47/32; A61K 9/107
(Continued)

(56) References Cited

U.S. PATENT DOCUMENTS

2009/0053276 A1    2/2009    Richard
2018/0105690 A1    4/2018    Kaneko et al.

OTHER PUBLICATIONS

Mathis et al. "Tuning the Viscoelasticity of Hydrogen-Bonded Polymeric Materials through Solvent Composition", Macromolecules, 2018, vol. 51, pp. 3975-3982. (Year: 2018).*

(Continued)

*Primary Examiner* — Joseph S Del Sole
*Assistant Examiner* — Ronald Grinsted
(74) *Attorney, Agent, or Firm* — Bell & Manning, LLC (57) ABSTRACT

A thermothickening fluid is provided which comprises a liquid phase; a first polymer comprising functional groups and having a room temperature solubility in the liquid phase; and a second, different polymer comprising functional groups and having a room temperature solubility in the liquid phase, wherein functional groups on the first polymer are capable of associating with functional groups on the second polymer to form complexes, and the room temperature solubility of the first polymer is greater than the room temperature solubility of the second polymer. The fluid is a colloid at room temperature, a solution at an elevated temperature, and exhibits a thermothickening/thinning transition viscosity value at a thermo-thickening/thinning transition temperature between room temperature and the elevated temperature.

20 Claims, 7 Drawing Sheets

(51) Int. Cl.
*A61K 47/32* (2006.01)
*B01J 13/00* (2006.01)
*C08L 39/08* (2006.01)

(58) Field of Classification Search
USPC ........................................................ 524/501
See application file for complete search history.

(56) References Cited

OTHER PUBLICATIONS

Cheaburu et al. ("Thermoresponsive Sodium Alginate-g-Poly(N-Isopropylacrylamide) Copolymers III. Solution Properties", (J. Appl. Polym. Sci., 2013, p. 3340-3348). (Year: 2013).*
Frederic Bossard et al., "A Novel Thermothickening Phenomenon Exhibited by a Triblock Polyampholyte in Aqueous Salt-Free Solutions," *Macromolecules* Feb. 2005, vol. 38; pp. 2883-2888.
Bruna V. de Lima et al., "Temperature-induced thickening of sodium carboxymethylcellulose and poly(N-isopropylacrylamide) physical blends in aqueous solution," *Polym. Bull.* (2012), vol. 69; pp. 1093-1101.
Nikoletta Stavrouli et al., "pH/Thermosensitive Hydrogels Formed at Low pH by a PMMA-PAA-P2VP-PAA-PMMA Pentablock Terpolymer," *Macromolecular Rapid Communications* 2008, vol. 29; pp. 130-135.
Yaoyao Chen et al., "High-Toughness Polycation Cross-Linked Triblock Copolymer Hydrogels," *Macromolecules* Apr. 26, 2017, vol. 50; pp. 3637-3646.
Lele Mathis et al., "Tuning the Viscoelasticity of Hydrogen-Bonded Polymeric Materials through Solvent Composition," *Macromolecules* 2018, vol. 51; pp. 3975-3982.
Kazi Sadman et al., "Influence of Hydrophobicity on Polyelectrolyte Complexation," *Macromolecules* 2017, vol. 50; pp. 9417-9426.
Yaoyao Chen et al., "Thermothickening Behavior of Self-Stabilized Colloids Formed from Associating Polymers," *Macromolecules* Jun. 21, 2019, vol. 52; No. 13, pp. 4926-4933.
The International Search Report and the Written Opinion issued on Jun. 18, 2020 for International Patent Application No. PCT/US20/18245; pp. 1-8.
C. Cheaburu et al., "Thermoresponsive Sodium Alginate-g-Poly(N-Isopropylacrylamide) Copolymers III. Solution Properties," Journal of Applied Polymer Science. Publication [online]. May 19, 2012 [retrieved on Apr. 6, 2020]. Retrieved from the Internet: ‚URL: https://www.researchgate.net/publication/236256013_Thermoresponsibe_Sodium_Alginate-9-PolyN-isopropylacrylamide_Copolymers_III_Solution_Properties> <DOI:10.1002/app.37789.
Y. Chen et al., "tuning the Viscoelasticity of Hydrogen-Bonded Polymeric Materials through Solvent Composition," *Macromolecules* May 15, 2018, vol. 51; pp. 3975-3982.
Y. Fan et al., "Thermo-Responsive Starch-g-(PAM-co-PNIPAM): Controlled Synthesis and Effect of Molecular Components on Solution Rheology," Polymers (Basel). Publication [online}. Jan. 19, 2018 [retrieved on Apr. 6, 2020]. Retrieved from the Internet, URL: https://www.ncbi.nlm.nih.giv/pmo/articles/PMC6414930/pdf/polymers-10-00092.pdf> <DOI:10.3390/polym10010091>.

\* cited by examiner

SELF-STABILIZED THERMOTHICKENING COLLOIDS

REFERENCE TO GOVERNMENT RIGHTS

This invention was made with government support under DMR1710491, NNCI1542205, and DMR1720139 awarded by the National Science Foundation and under 70NANB14H012 awarded by the U.S. Department of Commerce. The government has certain rights in the invention.

CROSS-REFERENCE TO RELATED APPLICATIONS

This application is a National Stage of International Application No. PCT/US2020/018245, filed Feb. 14, 2020, which claims the benefit of U.S. patent application Ser. No. 62/807,331, filed Feb. 19, 2019, the contents of which are herein incorporated by reference.

BACKGROUND

Thermoresponsive polymer solutions undergo structural transitions as a result of changes in the temperature, with marked changes in the resulting properties. This class of materials is useful for various applications including drug delivery, tissue engineering, energy storage, and rheology modification in polymer processing. Depending on the nature of the thermal response, these polymer solutions fall into two categories: lower critical solution temperature (LCST) systems and upper critical solution temperature (UCST) systems. Most studies on thermoresponsive polymers in aqueous solutions involve LCST systems, including poly (N-isopropylacrylamide) (PNIPAAm) and poly (propylene oxide) (PPO), enabling the critical temperatures to be tuned. The transition from a one-phase state below the LCST to a two-phase state above the LCST is an entropy driven process, releasing solvent molecules from polymer aggregates to increase the entropy of the system. UCST systems, where the transition is enthalpy driven, are less common but are observed in systems with stronger polymer/polymer or polymer/solvent interactions, often involving hydrogen bonding.

Incorporation of more than one polymeric species is a particularly useful strategy for designing thermoresponsive polymers with more complex rheological properties. Papagiannopoulos et al. reported that the introduction of a thermoresponsive moiety, PPO, to a bottle-brush polymer leads to an unexpected temperature-thickening/temperature-thinning transition in aqueous solutions, corresponding to the conformational change from micellar structures to collapsed clusters with increasing temperature. (Papagiannopoulos, A. et al., *Macromolecules* 2018, 51, 1644-1653.) Other types of amphiphilic architectures, for example, block copolymers, comb-shaped copolymers, and star-shaped polymers, have also been utilized for thermoresponsive materials design.

In many applications of polymer solutions, the viscosity needs to be stabilized at a certain level over a wide range of temperatures. Most polymer solutions exhibit thermo-thinning behavior, with a temperature-dependent viscosity that can be described by an Arrhenius equation. To compensate the drop of viscosity due to temperature increase, thermothickening polymers are introduced to the system as viscosity modifiers. For example, various additives are added to drilling fluids for maintaining the viscosity level at high temperature. PNIPAAm is the mostly used thermosensitive moiety as grafting chains in thermo-thickening polymer systems, with the viscosity increasing by 3 orders of magnitude or more as the temperature is increased from 40° C. to 60° C.

SUMMARY

Provided are thermothickening fluids, methods of making the fluids, and methods of using the fluids.

In one aspect, thermothickening fluids are provided. In embodiments, such a fluid comprises a liquid phase; a first polymer comprising functional groups and having a room temperature solubility in the liquid phase; and a second, different polymer comprising functional groups and having a room temperature solubility in the liquid phase, wherein functional groups on the first polymer are capable of associating with functional groups on the second polymer to form complexes, and the room temperature solubility of the first polymer is greater than the room temperature solubility of the second polymer. The fluid is a colloid at room temperature, a solution at an elevated temperature, and exhibits a thermothickening/thinning transition viscosity value at a thermo-thickening/thinning transition temperature between room temperature and the elevated temperature.

In other aspects, methods of making and using the fluids are also provided.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIGS. 5A-5D show the influence of stoichiometry on the properties of a series of samples, each having an overall polymer concentration of 8 wt %. FIGS. 5A-5B show the dependence of relative viscosities on temperature for all samples, with pure PMAA as a comparison (w08-A100). Images are shown in FIG. 5C with the numbers corresponding to the mole percentages of PMAA in the polymer mixture. Viscosities at 20° C. and 70° C. as functions of PMAA molar fraction are plotted in FIG. 5D.

DETAILED DESCRIPTION

Provided are thermothickening fluids, methods of making the fluids and methods of using the fluids.

Figure 1:
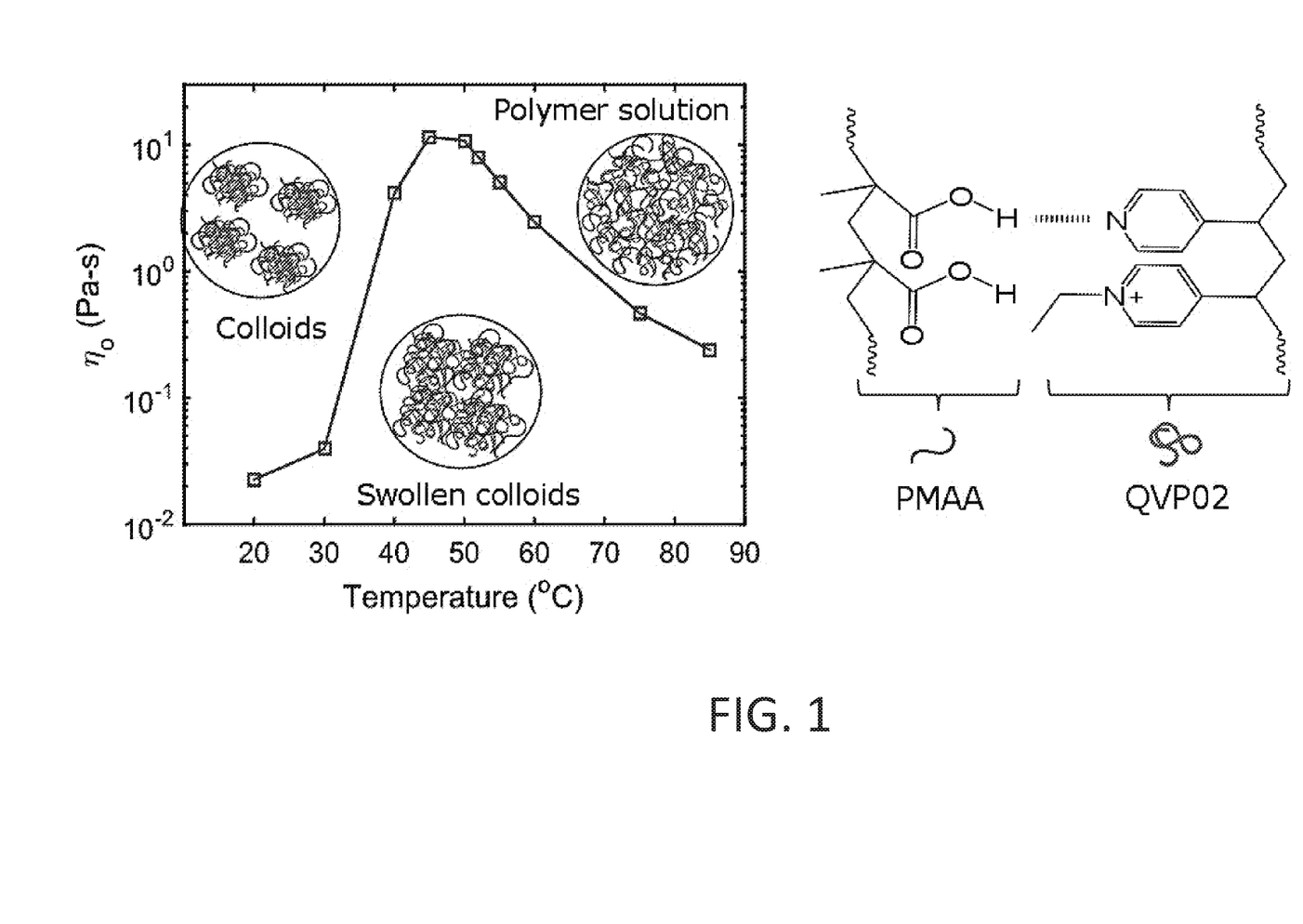
FIG. 1 is a schematic showing the design of thermoresponsive polymers based on the formation of a temperature-swellable, self-stabilized emulsion formed from a mixture of associating polymers.

The present thermothickening fluids comprise two distinct types of polymers dispersed in a liquid phase. As such, these fluids are different from existing approaches to thermothickening based on engineering a single type of polymer to incorporate thermoresponsive moieties or amphiphilic architectures. The present thermothickening fluids exhibit a viscosity maximum in a plot of viscosity versus temperature, i.e., exhibit both thermothickening and thermothinning behavior. (See, e.g., FIG. 1.) As FIG. 1 shows, at room temperature (20-25° C.), the fluid has a first viscosity. At an elevated temperature (greater than room temperature but e.g., about 80° C.), the fluid has a second viscosity. At an intermediate temperature between these values, the fluid has a maximum viscosity that is both greater than the first and second viscosities.

The viscosity may refer to relative viscosity, $\eta_r$. Relative viscosity $\eta_r$ is given by $\eta_r = \eta_0/\eta_{solvent}$, where $\eta_0$ is the zero shear viscosity of the solution (thermothickening fluid) and $\eta_{solvent}$ is the viscosity of solvent (liquid phase). Relative viscosity $\eta_r$ may be measured according to the techniques described in the Example, below. FIG. 3B shows a plot of $\eta_r$ versus temperature for several fluids which exhibit both thermothickening and thermothinning. The $\eta_r$ value at the maximum may be referred to as a thermothickening/thinning transition viscosity value and the temperature at which the maximum occurs may be referred to as a thermothickening/thinning transition temperature. These values are both marked with dashed lines for an illustrative thermothickening fluid (w10-A50).

Whether a fluid exhibits both thermothickening/thermothinning at all (and thus, may be referred to a thermothickening fluid according to the present disclosure) depends upon the chemical composition of the two types of polymers, the chemical composition of the liquid phase, the total amount of polymer, and the relative amounts of each type of polymer. Regarding these parameters, it is particularly important that the relative amounts of each type of polymer are adjusted to achieve the thermothickneing/thermothinning behavior. This is demonstrated in greater detail below for two specific types of polymers. In addition, it is also important that the types of polymers have different relative solubilities in the selected liquid phase as described in more detail below. In addition, as further described below, it is useful that one or both of the polymers have charged functional groups.

The parameters noted above also affect the specific values for the thermothickening/thinning transition viscosity value and the thermothickening/thinning transition temperature. Similarly, the particular temperature range over which the thermothickening/thinning behavior occurs depends upon these parameters. Illustrative temperature ranges include from room temperature to 150° C., from room temperature to 120° C., from room temperature to 100° C., or from room temperature to 80° C.

At room temperature, the present thermothickening fluid is in the form of a colloid. The colloidal particles of the colloid comprise both types of polymers which associate with one another via different functional groups on the polymers, thereby forming complexes. As the temperature increases, the interpolymer associations holding the complexes together weaken and the colloidal particles swell. This is accompanied by an increase in the viscosity of the fluid. As the temperature increases further, the viscosity of the fluid decreases. Above the thermothickening/thinning transition temperature, the fluid is in the form of a solution. In addition to plots of viscosity (e.g., $\eta_r$) versus temperature, confirmation of the colloidal nature (two phase) and solution nature (single phase) of the fluid (depending upon the temperature) may be obtained from turbidity measurements and dynamic light scattering measurements as described in the Example, below. (See, e.g., FIG. 3A.) Visual observation may also be helpful as colloids appear milky/opaque while solutions appear clear/transparent.

As noted above, ensuring that a fluid exhibits both thermothickening/thinning behavior, as well as achieving a particular thermothickening/thinning transition viscosity value and a thermothickening/thinning transition temperature, may be controlled by parameters including the selection of the liquid phase and the two types of polymers. Regarding the liquid phase, selection may also depend upon the application for the fluid, e.g., additive for a drilling fluid, additive for a personal care product such as a shampoo, or additive to an adhesive. Selection may also be driven by achieving the polymer solubilities described below. The liquid phase may be an aqueous liquid phase comprising water and an organic liquid, e.g., dimethyl sulfoxide. The relative amounts of water and organic liquid(s) in the liquid phase may vary. By way of illustration, the amount of the organic liquid may be in a range of from 80 wt % to 90 wt %, from 80 wt % to 88 wt %, from 80 wt % to 86 wt %, from 80 wt % to 84 wt %, or from 80 wt % to 82 wt %. In each case, the balance may be the water.

The two types of polymers in the present thermothickening fluid are chemically distinct from one another. One or both of the two types of polymers may be homopolymers, i.e., polymers composed of a single type of monomer. In embodiments, the polymers are not copolymers (including block copolymers) or bottle brush polymers and the fluid does not comprise such polymers. Each type of polymer in the fluid comprises functional groups which are capable of associating with corresponding functional groups on the other type of polymer to form a complex. (The term "capable" is used in reference to the fact that the actual association/complexation depends upon external conditions such as the temperature.) The association may be noncovalent, e.g., hydrogen bonding. Thus, one of the functional groups may be a hydrogen bonding donor. By way of illustration, hydrogen bonds may form between carboxylic acid groups (donor) on one of the two types of polymers and amine groups on the other of the two types of polymers. (See, e.g., FIG. 1.) Carboxylic acid groups may be provided by (meth)acrylic acid-based monomers. Amine groups may be provided by pyridine-based monomers and imidazole-based monomers. The term "-based" means that the respective monomer comprises a (meth)acrylic acid group, a pyridine group, an imidazole group, etc.

At least one of the two types of polymers generally comprises charged functional groups which are capable of inducing repulsive interactions between the colloidal particles. However, both types of polymers may comprise charged functional groups. This is useful to stabilize the colloidal particles in the fluid. Charged groups are also useful to tune the solubility of the polymer(s) in the fluid. By way of illustration, quaternary amine groups are charged groups which, upon formation of the polymer complexes described above, result in charged colloidal particles stabilized by repulsive forces. Quaternary amine groups may be provided by quaternizing amine groups, e.g., the amine groups of pyridine-based monomers. Other charged functional groups include carboxylate groups (—COO$^-$)and sulfite groups (—SO$_3^-$). The percentage of charged functional groups may be adjusted to balance the effect on polymer solubility and colloidal particle stabilization. In embodiments, the percentage of charged functional groups is in the range of from 1% to 5%, from 1% to 4%, or from 1% to 3%.

The two types of polymers in the present thermothickening fluid have different room temperature solubilities in the selected liquid phase; one of the two types of polymers has a room temperature solubility that is greater than the other in the selected liquid phase. In addition, one of the polymers is selected so that it is relatively insoluble in the liquid phase at room temperature while the other polymer is selected so that it is relatively soluble in the liquid phase at room temperature. Room temperature solubility may refer to the solubility parameter $\chi$. For a selected polymer and liquid phase, the $\chi$ parameter may be measured by measuring the osmotic pressure of a dilute polymer solution. A value of $\chi$<0.5 at room temperature in the selected liquid phase may be used to indicate "relatively soluble" while a value of $\chi$>0.5 may be used to indicate "relatively insoluble." The association of the two types of polymers via the functional groups and the relatively soluble nature of one of the two types of polymers facilitates formation of a stable colloid. This colloid may be stable at room temperature over extended periods of time, e.g., at least 3 months, at least 6 months, or at least a year.

An illustrative thermothickening fluid is described in the Example below and comprises a liquid phase comprising water and dimethyl sulfoxide, poly (methacrylic acid) (PMAA) as one of the polymers and partially quaternized poly(4-vinyl pyridine) (QVP) as the other of the two polymers. As described below, it is found that complexation of these two polymers can induce a significant thermothickening/thinning transition. The multicomponent polymer solutions form stable colloidal suspensions at low temperatures that are stable for very long periods of time. An increase of temperature swells the QVP-PMAA complexes, and softens the strength of the complexation simultaneously, resulting in an unusual thermal response. The simplicity of polymer architecture, and the controllability of polymer structures make this system a useful one for stabilizing suspensions while maintaining good processability.

Figure 5A:
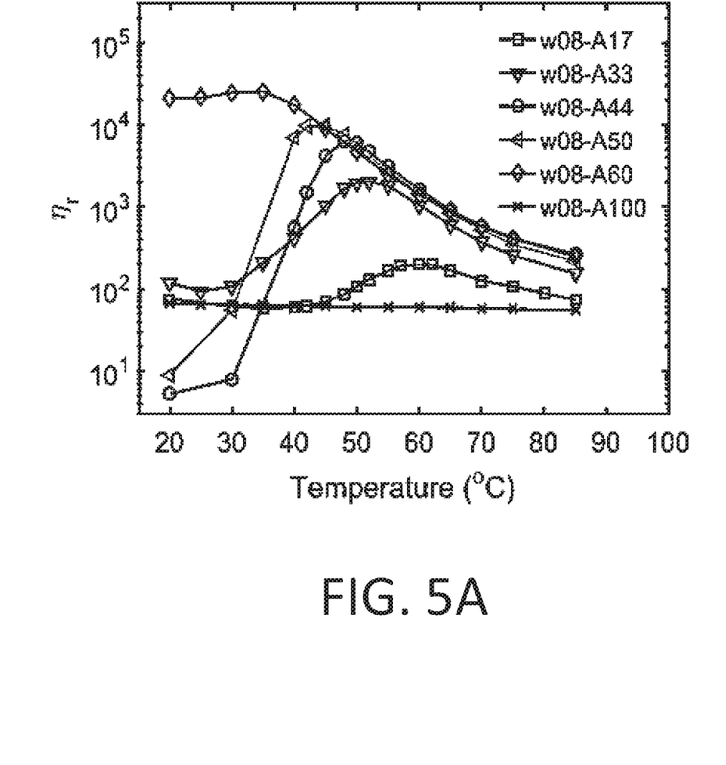
Figure 5B:
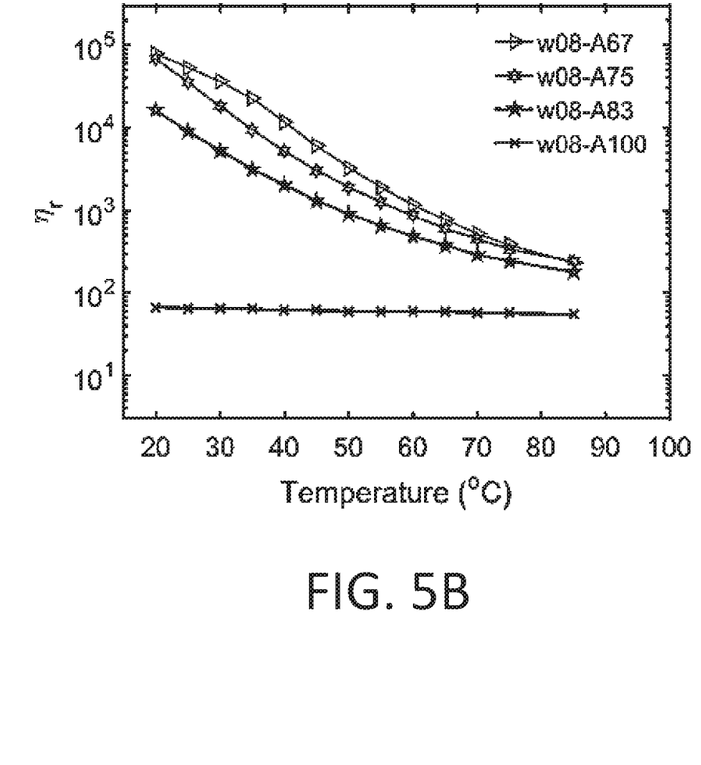

The total amount of polymer in the present thermothickening fluid and the relative amounts of the two types of polymers may vary. As noted above, these parameters may be used to ensure the thermothickening/thinning behavior and to tune the rheological properties of the fluid, including the thermo-thickening/thinning transition viscosity value and thermo-thickening/thinning transition temperature. The relative amounts may be quantified by reference to a mole percentage of certain of the repeating groups (e.g., hydrogen bonding donor groups) of the polymers as compared to the total repeating groups. By way of illustration, FIG. 3B shows a plot of $\eta_r$ versus temperature for six different thermothickening fluids based on water/dimethyl sulfoxide (liquid phase), poly(methyacrylic acid) (one type of polymer) and partially quaternized poly(4-vinyl pyridine) (the other type of polymer). The mole percentage of methacrylic acid repeating units relative to the total of all polymer repeating units was fixed at 50%, while the total amount of polymer in the liquid phase varied from 8 wt % to 12 wt %. The results show that the total amount of polymer affects both the magnitude of thermothickening/thinning transition viscosity value and temperature at which the maximum viscosity is achieved. Analogous results for fluids at a fixed total amount of polymer but varying mole percentage of methacrylic acid are shown in FIG. 5A-5B. Together, both sets of results show that large increases in viscosity (relative to the room temperature viscosities) may be achieved using total polymer amounts in the range of from about 8 wt % to about 12 wt % and mole percentage of methacrylic acid in the range of from about 44% to about 50%.

Regarding the viscosity increases, in embodiments, the present thermothickening fluid is characterized by a thermothickening/thinning transition viscosity value that is at least 10 times greater, at least 100 times greater, at least 1000 times greater, at least 1200 times, at least 1500 times, or at least 2000 times greater than the viscosity value of the fluid at room temperature. This increase may be achieved over a temperature increase of, e.g., 10° C., 15° C., 20° C., 25° C., or 30° C. For Example, for the w08-A44 fluid (water/dimethyl sulfoxide, poly(methyacrylic acid), and partially quaternized poly(4-vinyl pyridine) at a total polymer weight of 8 wt % and a mole percentage of methacrylic acid of 44%), the room temperature (about 20° C.) $\eta_r$ is about 3, the thermothickening/thinning transition temperature is about 48° C., and the thermothickening/thinning transition $\eta_r$ is about 6000. This gives an increase in viscosity of about 2000 over a temperature increase of less than about 30° C. This is an unexpected and remarkable increase in viscosity obtained from a mixture of simple homopolymers using a relatively small change in temperature.

In embodiments, the present thermothickening fluid does not comprise, i.e., is free of, a surfactant. In embodiments, the thermothickening fluid consists of the liquid phase and the two types of polymers.

The present thermothickening fluids may be made by combining the desired amounts of each type of polymer in a desired volume of the liquid phase. The fluid may be mixed at an elevated temperature sufficient to obtain a solution, followed by cooling to room temperature to obtain a colloid (i.e., the thermothickening fluid is in its colloidal form).

The present thermothickening fluids may be used in a variety of applications. These applications may involve adding a desired amount of the thermothickening fluid to any liquid whose rheological properties require modification, e.g., drilling fluids, personal care products, adhesives, etc. Then, the desired thermothickening/thinning behavior may be induced by increasing the temperature.

EXAMPLE

Introduction

The complexation of partially ethyl-quaternized poly (4-vinyl pyridine) (QVP) and poly (methacrylic acid) (PMAA) induces a dramatic change in solution viscoelasticity. In this Example, a model system consisting of QVP (with 2% charge), PMAA, and DMSO-water mixed solvent (85 wt % DMSO-15 wt % water) was investigated, which exhibits a remarkable thermothickening behavior, characterized by an increase of viscosity by 3 orders of magnitude when the temperature is increased by 15° C. At low temperatures, this system behaves as a low-viscosity milky colloidal suspension that remains stable for periods of at least one year. At higher temperatures the colloids swell, increasing their effective volume fraction and giving rise to the observed viscosity increase. Rheometry, UV-Vis spectroscopy, and dynamic light scattering (DLS) were utilized to shed light on the mechanism of this phenomenon. This simple approach for achieving thermo-thickening capability provides a new platform for designing thermoresponsive solutions from simple polymer mixtures.

Materials and Methods

Materials

Poly (4-vinyl pyridine) (P4VP, molecular weight, 200 kg/mol, Scientific Polymer Products Inc.) and poly (methacrylic acid) (PMAA, molecular weight, >100 kg/mol, Scientific Polymer Products Inc.) were used without further purification. Dimethyl sulfoxide (DMSO) was purchased from Sigma-Aldrich Company and used as received. Quaternization of P4VP was achieved by adding bromoethane (EtBr, Sigma Aldrich, 98%) to a P4VP solution to reach the desired charge ratio. In the notation, QVP02 denotes partially quaternized P4VP with charge fraction of 0.02. The chemical structures of P4VP and QVP02 were confirmed by $^1$H-NMR in a Bruker Advance III, 500 MHz system, with spectra previously reported. (Chen, Y. et al., *Macromolecules* 2017, 50, 3637-3646.)

Methods

Sample Preparation: Samples were prepared by mixing the desired amounts of QVP02, PMAA, and solvents (DMSO and water) in vials by constantly stirring the mixtures on a heating plate (T~65° C.) to obtain transparent solutions, which were then removed from the hot plate and allowed to cool to room temperature. The solvent condition used in this Example was fixed to be a mixed solvent containing 85 wt. % DMSO and 15 wt. % water. The total polymer concentration used was in the range of 1 wt. %-12 wt. N. wXX-AYY was used to represent a sample with a total polymer weight percentage of XX and a mole percentage of methacrylic acid of YY. The mole fraction here is defined as the percentage of methacrylic acid repeating units relative to the total of all polymer repeating units (methacrylic acid, quaternized vinylpyridine, and unquaternized vinylpyridine). Samples involved in this Example were as follows: (1). For the colloid packing and solution scaling study, stoichiometric samples with a methacrylic acid mole fraction of 0.5 were used. These samples include w01-A50, w03-A50, w05-A50, w08-A50, w10-A50, and w12-A50. (2). For the investigations of the role of stoichiometry, the total polymer weight fraction was fixed at 8 wt. %, varying the mole fraction of methacrylic acid across the full composition range. These samples include w08-A00, w08-A17, w08-A33, w08-A44, w08-A50, w08-A60, w08-A67, w08-A75, w08-A83, and w08-A100.

Turbidity: Turbidity measurements of polymer suspensions were conducted on a HP (Agilent) 8452 UV/Vis DAD spectrophotometer in the temperature range, 20-70° C. With constant stirring at the rate of 300 rpm, polymer solutions (3~10 wt. %) were placed in plastic cells, and the adsorption of light at a wavelength of 400 nm was recorded at varied temperatures.

Dynamic Light Scattering (DLS): The sizes of aggregates in the suspensions were characterized by dynamic light scattering (DLS) utilizing a Zetasizer Nano ZS Malvern instrument, equipped with a He—Ne gas laser (633 nm wavelength). The detector was located at 173° scattering angle. Samples were first diluted to 1 wt. % prior to the measurements, and then loaded in disposable solvent resistant microcuvettes. The reflective index of mixed solvent was 1.459, and the dielectric constant was 61.6, respectively.

Rheology: Rheological properties of polymer solutions were probed by an Anton Paar 302 rheometer, using a cone-plate geometry (plate diameter, 50 mm; cone angle, 2°). To prevent solvent evaporation, a transparent plastic hood was used to seal the measuring system. 5% shear strain was found be to within the linear viscoelastic regime for these types of materials. Thus, oscillatory frequency sweep tests ($\omega$=0.1-100 rad/s) were performed in the range of $\gamma$=0-5%. Zero shear viscosities of samples were obtained from constant strain rate tests at strain rates ranging from 0.01 s$^{-1}$ to 100 s$^{-1}$.

Results and Discussion

Temperature Thickening/Thinning Transition

A homopolymer, QVP02, was selected to start, the solubility of which depends on the degree of charge, solvent composition, and temperature. The chosen solvent composition (85 wt % DMSO-15 wt % water) was not a good solvent for QVP02 at room temperature, resulting in inhomogeneous polymer clusters when the polymer concentration was 8 wt %. Increasing the temperature enhanced the solubility of QVP02, giving transparent polymer solutions when the system was heated to ~50° C. The incorporation of a second polymer, PMAA (which is soluble at room temperature in 85 wt % DMSO-15 wt % water), yielded a milky suspension. This suspension remains stable at room temperature for times of at least one year.

Figure 2A:
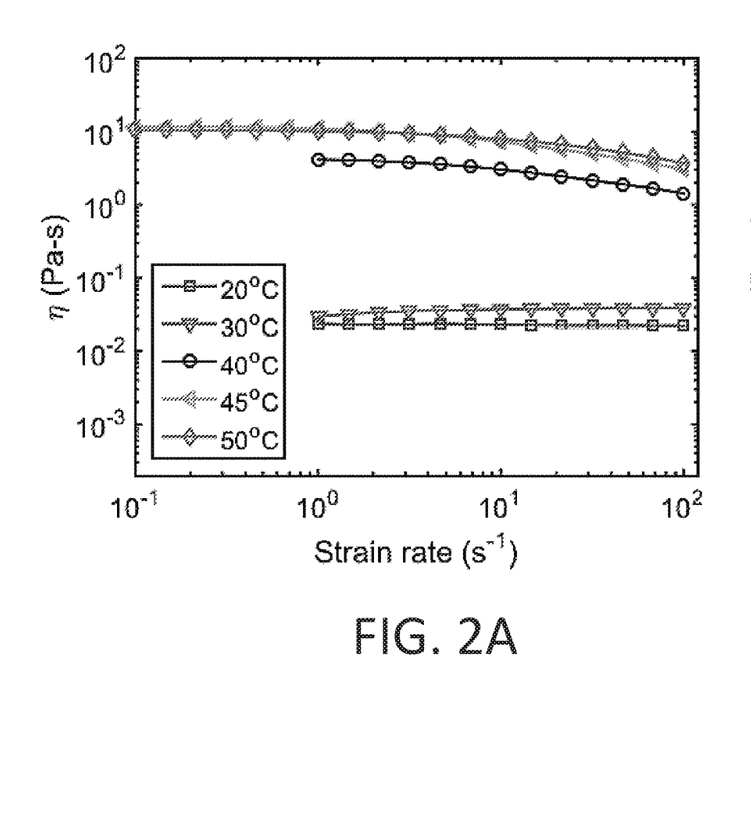
FIGS. 2A-2B show flow curves of the w08-A50 sample at various temperatures. Polymer mixtures transition from milky suspensions to homogeneous solutions. From 20° C. to 50° C., the sample forms a stable, cloudy suspension with a viscosity that increases with temperature (FIG. 2A); at temperatures above 50° C., clear solutions are formed with a viscosity that decreases with temperature (FIG. 2B).
Figure 2B:
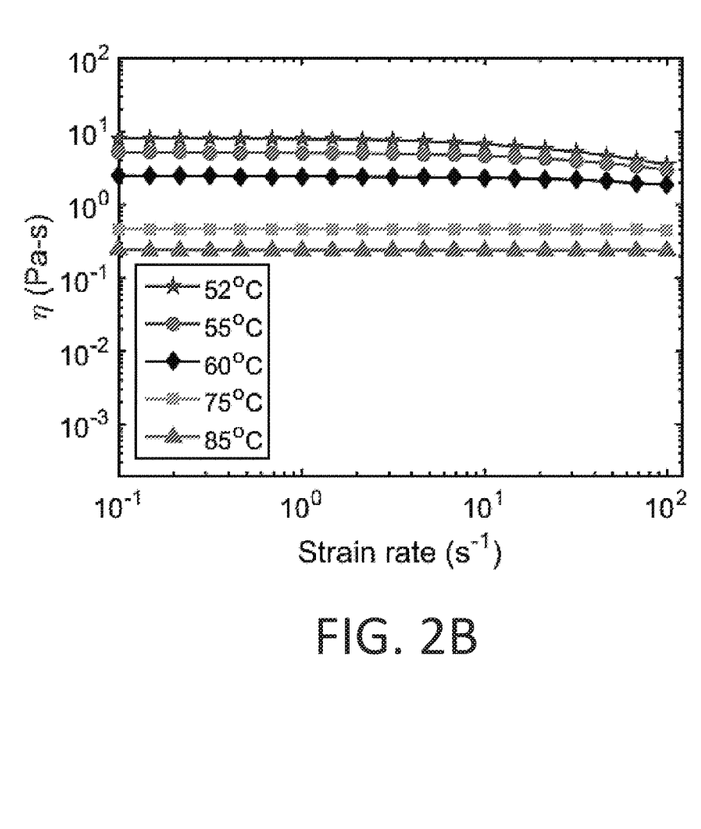

When heated, this suspension exhibited a strong thickening/thinning transition, characterized by the temperature-dependent viscosity shown in FIGS. 2A-2B. In the investigated temperature range (20-85° C.), the suspension/solution remained macroscopically homogeneous, behaving as a Newtonian liquid or a viscoelastic liquid with slight shear thinning behavior. At the lowest temperatures (20-50° C.), the system at a microscopic level was in a two-phase state, forming a milky suspension. The viscosity of this suspension was affected dramatically by the temperature, increasing from 0.02 Pa·s to 10 Pa·s as the temperature increased from 20° C. to 50° C. At ~50° C., the suspension transitioned to a more transparent solution, which adsorbed less light, as is demonstrated in FIG. 3A. The solution remained transparent at higher temperatures, and the viscosity decreased from its maximum value by a factor of about 50 as the temperature increased to 85° C.

This maximum in the viscosity as a function of temperature is rarely observed in polymer solutions. To achieve the combined effect of thickening and thinning in one single system, more complicated architectures (e.g. bottle-brush, block copolymers) have been designed to incorporate multiple thermoresponsive mechanisms while maintaining the stability of colloidal structures. Yet, the conventional mixing of QVP02 and PMAA reported in this Example is believed to be the simplest method for producing polymer suspensions with a strong thermothickening behavior.

Colloid Packing at Low Temperature

Hydrogen bonding is the attractive interaction that drives the complexation of QVP02 and PMAA, forming insoluble colloids at room temperature. The soluble component, PMAA, is the hydrogen bonding donor for the association of QVP02 and PMAA. PMAA also acts as a surfactant for stabilizing colloids because PMAA favors both QVP02, and the solvent. An increase in temperature weakens the QVP02-PMAA interactions, swelling the colloids and increasing their overall volume fraction in the suspension. The enormous swelling during heating leads to the observed thermothickening of colloidal suspensions, increasing the viscosity by more than 2 orders of magnitude for the w08-A50 sample and by over 3 orders of magnitude for the w10-A50 sample. When the temperature is above the point at which the QVP02-PMAA complex becomes soluble, further increases of temperature result in a decreased viscosity, similar to behavior of homogeneous polyelectrolyte complex solutions.

Figure 3A:
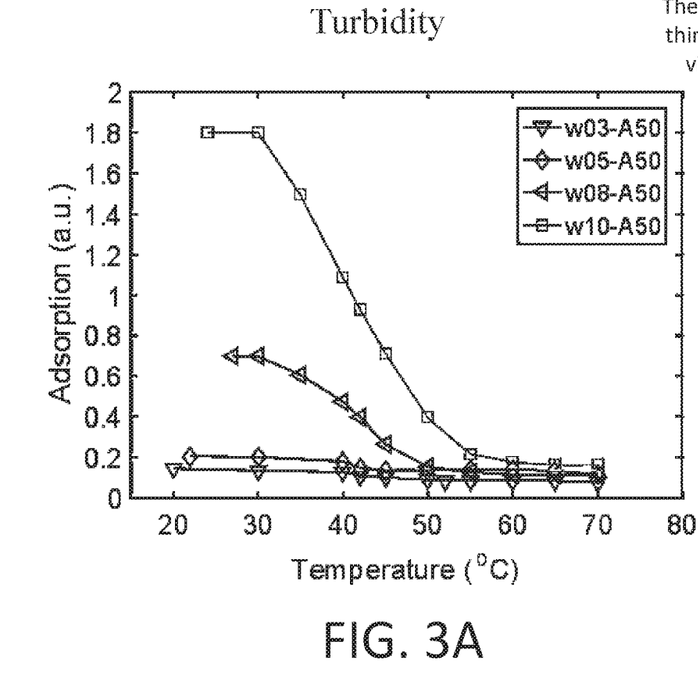
FIG. 3A shows temperature dependence of the turbidity for a series of stoichiometric samples with overall polymer concentrations ranging from 1 to 10 wt. %.
Figure 3B:
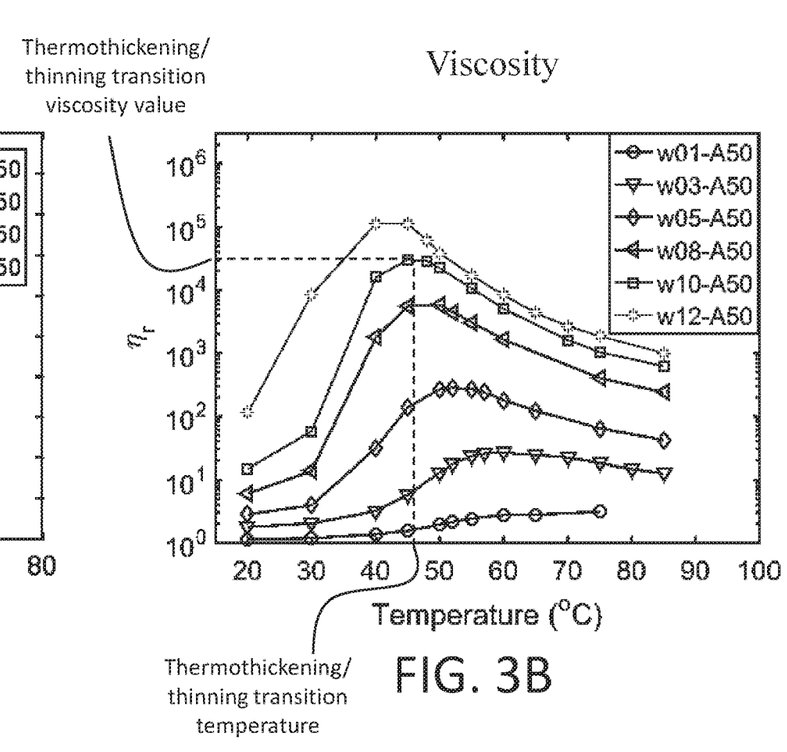
FIG. 3B shows temperature dependence of the relative viscosities of a similar series of stoichiometric samples, with concentrations ranging from 1 to 12 wt. %. The relative viscosity is given by $\eta_r = \eta_0/\eta_{solvent}$, where $\eta_0$ is the zero shear viscosity of the solution and $\eta_{solvent}$ is the viscosity of solvent. Values of $\eta_{solvent}$ are listed in the Example.

Polymer suspensions with different concentrations behaved in a qualitatively similar manner, as shown in FIGS. 3A-3B. The observed drop in turbidity corresponds to the maximum in viscosity in each case, while the exact transition point was determined by the combined effect of colloid swelling and complexation softening. For more concentrated samples, the maximum packing of swollen colloids was reached at lower temperatures.

In order to better understand these results, the following expression was used for the relative viscosity, $\eta_r$, similar to the following expression:

$$\eta_r = [1-\phi/\phi^*]^{-2} \quad (1)$$

Here, $\phi$ is the volume fraction of the colloidal phase, and $\phi^*$ is a critical packing fraction. Bullard et al. have suggested a correction to Eq. 1 that ensures a smooth transition to asymptotic forms of the reduced viscosity expressions that are known to apply to low volume fractions, and that allow the effects of the viscosity ratio between the emulsion particles and the suspending medium to be accounted for. (Bullard, J. W. et al., *Journal of Colloid and Interface Science* 2009, 330, 186-193.) For the situations that are relevant to this Example, this correction is not substantial, and so it is not used in this analysis. By assuming that all of the polymers exist in the colloidal phase, the following was obtained for:

$$\phi = c/c_d \quad (2)$$

where c is the overall weight fraction of polymer in the system, and $c_d$ is the weight fraction of polymer within the colloidal particles. With n=2, the following was obtained:

$$\eta_r = \left[1 - \frac{c}{\phi * c_d}\right]^{-2} \quad (3)$$

Figure 4:
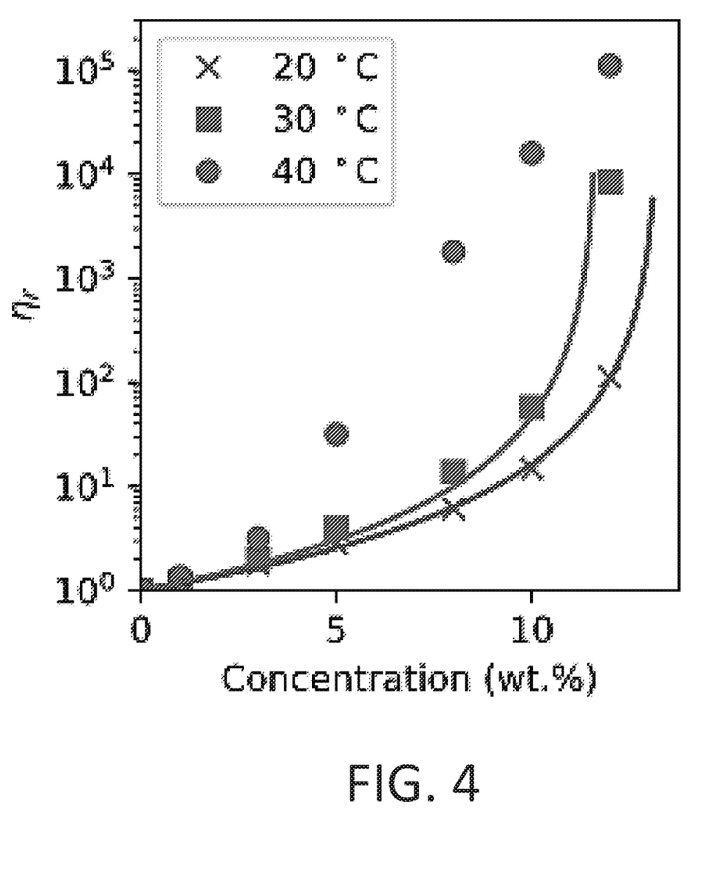
FIG. 4 shows relative viscosity for stoichiometric samples at relatively low temperatures (40° C.). The solid lines are representations of Eq. 3, with $\phi^* c_d = 13.3$ wt. % at 20° C. and $\phi^* c_d = 11.7$ wt. % at 30° C.

FIG. 4 demonstrates the effectiveness of Eq. 3 in describing the viscosity dependence of colloidal suspensions. At low temperatures, Eq. 3 gives good agreement with experimental data, with $\phi^* c_d$=13.3 wt. % at 20° C. and $\phi^* c_d$=11.7 wt. % at 30° C. Estimated values of for $c_d$ obtained from these values are discussed in the following section.

Effect of Stoichiometry

In traditional colloidal suspensions, additional surfactants (or additives) are needed in the mixture to introduce repulsive interactions between individual particles. In this Example, the colloids were presumably stabilized by a PMAA-rich layer that formed at the particle/solution interface. To gain a better understanding of the factors that enable these self-stabilized emulsions to form, a series of non-stoichiometric polymer suspensions at a fixed polymer weight fraction, 8 wt. %, was investigated.

FIGS. 5A-5D show the effect of stoichiometry on the rheological behavior of this system. At room temperature, the QVP02 polymer did not form a macroscopically homogeneous suspension but instead appeared as a collection of solvent-swollen precipitates that could be emulsified by the inclusion of PMAA. The addition of ~17% PMAA to QVP02 was sufficient to enable the formation of a stable, opaque suspension. Further increases of the PMAA content reduced the hydrodynamic diameter of the polymer rich suspension droplets from 330 nm to 138 nm, as shown by the dynamic light scattering results in Table 1.

TABLE 1

Sizes and polymer concentrations of the colloids as determined in a series of different samples at 20° C. The sizes were determined by dynamic light scattering, and the concentrations were obtained from Eq. 3, using measured values of $\eta_r$.

| Sample | Diameter (nm) | Standard error (nm) | $\phi * c_d$ | $c_d$ ($\phi^*$ = 0.75) |
|---|---|---|---|---|
| w08-A17 | 330 | 73 | 9.0 | 12.0 |
| w08-A33 | 166 | 36 | 8.8 | 11.7 |
| w08-A44 | 151 | 45 | 14.2 | 18.9 |
| w08-A50 | 147 | 30 | 12.0 | 16.0 |
| w08-A60 | 138 | 27 | | |

Figure 5C:
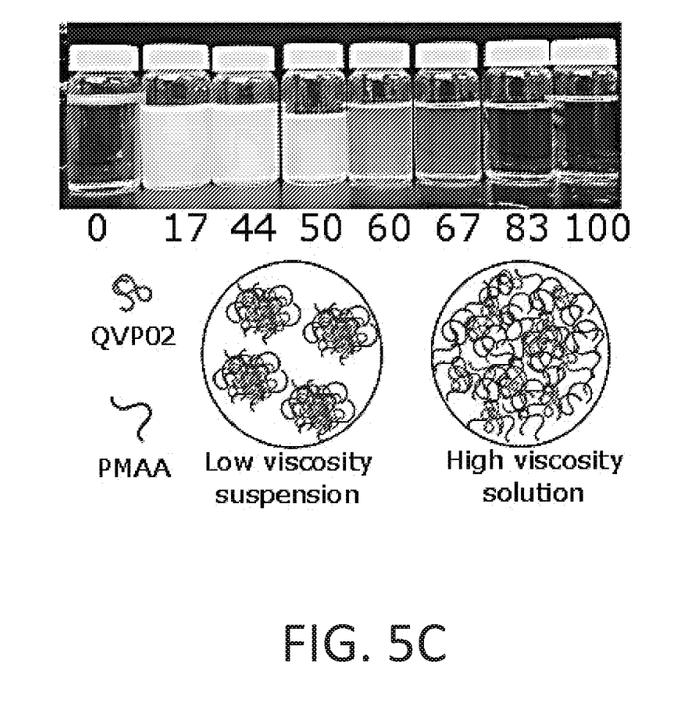
Figure 5D:
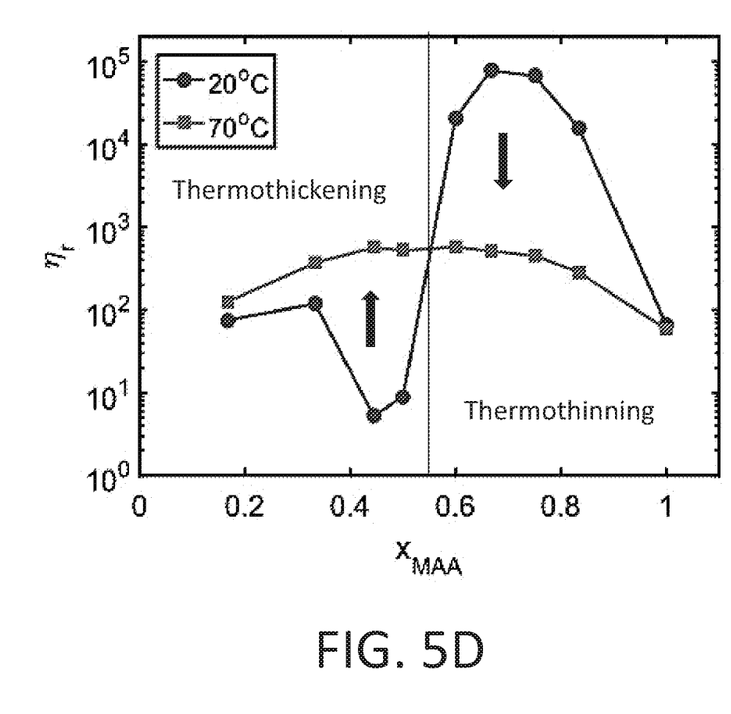

Rheological investigations of the w08 series of solutions with different PMAA contents provide a more complete picture of the behavior of these solutions. The temperature dependent viscosity for each of these different compositions is shown in FIGS. 5A and 5B. Images of each of the samples are shown in FIG. 5C, and the composition dependence of the relative viscosity at 20° C. and 70° C. is compared in FIG. 5D. This comparison of $\eta_r$ at 20° C. and 70° C. gives the clearest description of the conditions for which thermothickening was observed. When the mole fraction of methacrylic acid was less than ~0.55, thermothickening in these solutions was observed, with $\eta_r$ at 70° C. exceeding the value of $f_r$ at 20° C. At low temperatures these mixtures formed colloidal suspensions, and the measured values of $\eta_r$ can be used in conjunction with Eq. 3 to estimate the value of $\phi^* c_d$ for each suspension at 20° C. Assuming a value of 0.75 for the critical packing fraction, $\phi^*$, the estimates that are listed in Table 1 were obtained for $c_d$, the polymer concentration within the suspended, polymer rich phase. The suspension phase was most concentrated for systems that were stoichiometrically balanced or had a slight excess of QVP relative to MAA ($x_{MAA}$=0.44 and $x_{MAA}$=0.5). In these systems, the concentration in the suspended phase was approximately twice as large as the average polymer concentration in the solution, giving a value of ~0.5 for the packing fraction, $\phi$, which is substantially less than the critical packing fraction, $\phi^*$. As the suspension was heated, the value of $\phi_d$ decreased, increasing $\phi$ and giving a rapid increase in the viscosity as $\phi$ approached $\phi^*$. When $\phi$ exceeded $\phi^*$, Eq. 1 could no longer be used, since in these cases the properties were determined by the properties of a homogeneous polymer solution. These properties determine the maximum viscosity that can be obtained at a given temperature and are discussed more in detail in the following section.

Associating Polymer Solutions at High Temperature

Figure 6A:
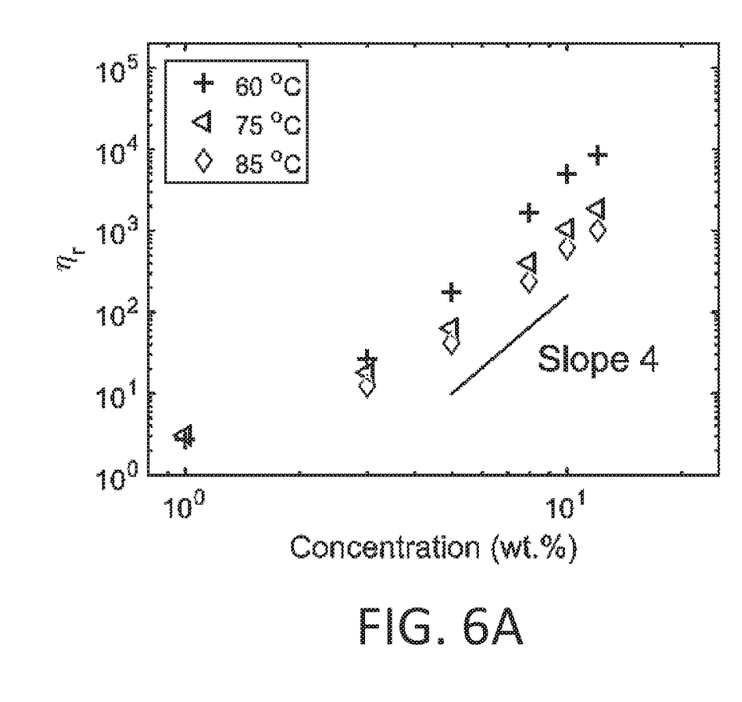
FIG. 6A shows concentration dependence of the high temperature viscosity.
Figure 6B:
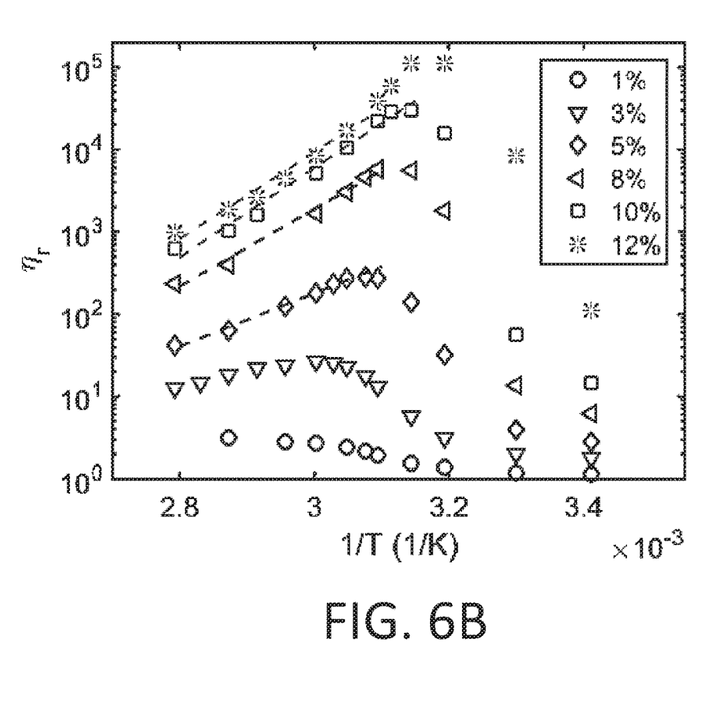
FIG. 6B shows Arrhenius plots for stoichiometric samples ($X_{MAA}$=0.5). The dashed lines correspond to activation energies for 5, 8, 10 and 12 wt % samples of 62.1, 89.4, 104, and 101 kJ/mol, respectively.

The high-temperature properties of these solutions are the characteristics of other polymer solutions with associating groups. These solutions are shear-thinning (in FIG. 2B), but the focus here is on the limiting viscosity obtained at low shear rates. The viscosity of a stoichiometric solution scaled as the fourth power of the solution concentration for the higher temperatures (60° C., 75° C., and 85° C.) as shown in FIG. 6A. This behavior is consistent with the prediction of semidilute associating polymer solution theory by Rubinstein et al. (Rubinstein, M. et al., *Macro-molecules* 2001, 34, 1058-1068.) This indicates that polymers possess multi-stickers along each chain, being able to form associations in solutions. The dynamical hydrogen bonds bridge intermolecular polymer chains at short time scales and relax at longer time scales, giving a temperature dependent zero-shear viscosity determined by the strength of these interactions. To evaluate the strength of the interactions responsible for determining the behavior of these systems, an Arrhenius plot of the relative viscosity is shown in FIG. 6B. The slope of $\log(\eta_r)$ v.s. 1/T is an indicator of the apparent activation energy. It should be noted that only a narrow temperature range (50° C.-80° C.) was used for the fitting, so an Arrhenius equation only gives an approximation on the association energy level, which is 60-100 kJ/mol.

Conclusions

In this Example, an extensive experimental study was performed on a UCST model system, which consisted of QVP02, PMAA, DMSO, and water. This simple mixture exhibited an unexpected thermothickening/thinning transition at temperatures from ~40-60° C. At low temperatures (≤40° C.), the observed colloidal suspension was self-stabilized by PMAA within the polymer blend, which acted as a surfactant. The thermo-thickening of polymers originated from the swelling of insoluble complex aggregates, characterized by a turbidity decrease in this regime. At higher temperatures (≥60° C.), this system behaved as an associating polymer solution, the viscosity of which scaled with fourth power of the polymer concentration. The temperature dependence of relative viscosity could be described by an Arrhenius equation, giving an estimation of polymer association activation energy around 60-100 kJ/mol. This new thermo-thickening/thinning mechanism enables the design of other thermoresponsive polymers solutions that are elegantly simple and yet exhibit a range of temperature-dependent properties. Example properties shown in this Example include an increase in viscosity by a factor of 1000 or more as the temperature increased by 20° C.

Additional information may be found in U.S. Pat. Appl. No. 62/807,331, which is hereby incorporated by reference in its entirety.

TABLE 2

85 wt. % DMSO-15 wt. % water mixed solvent viscosity at varied temperatures. Viscosities were measured by using cone-plate geometry (50 mm diameter).

| T (° C.) | 20 | 25 | 30 | 35 | 40 | 42 | 45 | 48 | 50 |
|---|---|---|---|---|---|---|---|---|---|
| $\eta_{solvent}$ (mPa-s) | 3.71 | 3.24 | 2.86 | 2.53 | 2.28 | 2.19 | 2.06 | 1.92 | 1.85 |
| T (° C.) | 52 | 55 | 57 | 60 | 65 | 70 | 75 | 85 | |
| $\eta_{solvent}$ (mPa-s) | 1.78 | 1.65 | 1.58 | 1.50 | 1.36 | 1.26 | 1.16 | 1.00 | |

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A thermothickening fluid comprising:
   a liquid phase;
   a first polymer comprising functional groups and having a room temperature solubility in the liquid phase; and
   a second, different polymer comprising functional groups and having a room temperature solubility in the liquid phase, wherein functional groups on the first polymer are capable of associating with functional groups on the second polymer to form complexes, and the room temperature solubility of the first polymer is greater than the room temperature solubility of the second polymer,
   wherein the fluid is a colloid at room temperature, a solution at an elevated temperature, and exhibits a thermothickening/thinning transition viscosity value at a thermo-thickening/thinning transition temperature between room temperature and the elevated temperature.

2. The fluid of claim 1, wherein the association between corresponding functional groups on the first and second polymers to form the complexes is hydrogen bonding.

3. The fluid of claim 1, wherein the functional groups of one of the first and second polymers are carboxylic acid groups.

4. The fluid of claim 1, wherein the functional groups of one of the first and second polymers are amine-groups.

5. The fluid of claim 1, wherein one or both of the first and second polymers comprise additional functional groups capable of inducing repulsive interactions between colloidal particles in the colloid.

6. The fluid of claim 5, wherein the additional functional groups are charged functional groups.

7. The fluid of claim 6, wherein the charged functional groups are quaternary amine groups, carboxylate groups, sulfite groups, or combinations thereof.

8. The fluid of claim 1, wherein one of the first and second polymers is composed of (meth)acrylic acid-based monomers.

9. The fluid of claim 1, wherein one of the first and second polymers is composed of pyridine-based monomers or imidazole-based monomers.

10. The fluid of claim 4, wherein at least some of the amine groups are quaternized.

11. The fluid of claim 1, wherein the first and second polymers are homopolymers.

12. The fluid of claim 1, wherein the first polymer has a solubility parameter $\chi$ at room temperature of less than 0.5 and the second polymer has a solubility parameter $\chi$ at room temperature of greater than 0.5.

13. The fluid of claim 1, wherein the first and second polymers are homopolymers, the functional groups of one of the first and second polymers are carboxylic acid groups, the functional groups of the other of the first and second polymers are amine-groups, and at least some of the amine groups are quaternized.

14. The fluid of claim 13, wherein one of the first and second polymers is composed of (meth)acrylic acid-based monomers and the other of the first and second polymers is composed of pyridine-based monomers or imidazole-based monomers.

15. The fluid of claim 13, wherein the fluid has a total polymer weight of from 8 weight % to 12 weight % and a mole percentage of a monomer providing the carboxylic acid groups in a range of from 44% to 50%.

16. The fluid of claim 1, wherein the liquid phase is an aqueous solution comprising water and an organic liquid.

17. The fluid of claim 1, wherein the thermothickening/thinning transition viscosity value is at least 100 times greater than a viscosity of the fluid at room temperature.

18. The fluid of claim 1, wherein the thermothickening/thinning transition temperature is no more than 25° C. above room temperature.

19. A method of making the thermothickening fluid of claim 1, comprising combining the liquid phase, the first polymer and the second polymer at the elevated temperature to obtain the solution and cooling the solution to room temperature to obtain the colloid.

20. A method of using the thermothickening fluid of claim 1, comprising adding the fluid to a liquid and heating the liquid to change the liquid's viscosity.

\* \* \* \* \*